J. L. CREVELING.
ELECTRIC REGULATION.
APPLICATION FILED MAY 2, 1916. RENEWED APR. 17, 1922.
1,437,724.
Patented Dec. 5, 1922.
3 SHEETS—SHEET 2.
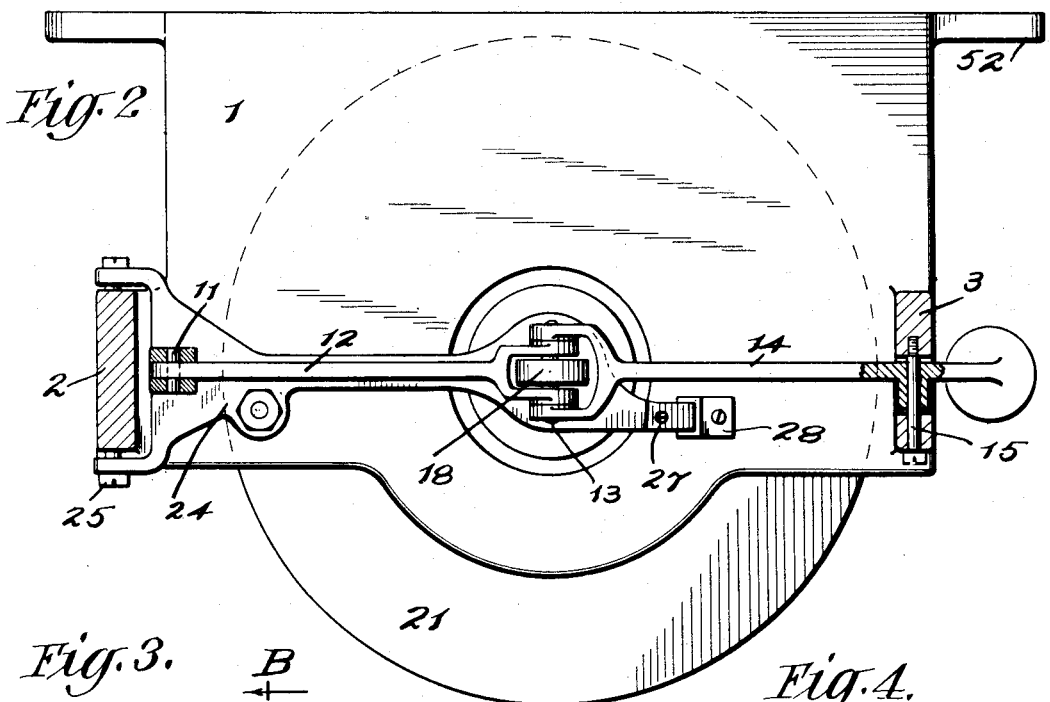
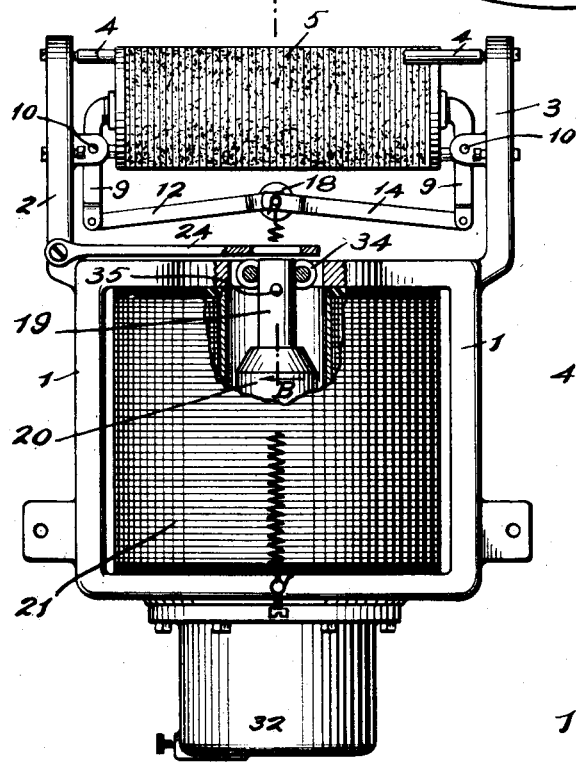
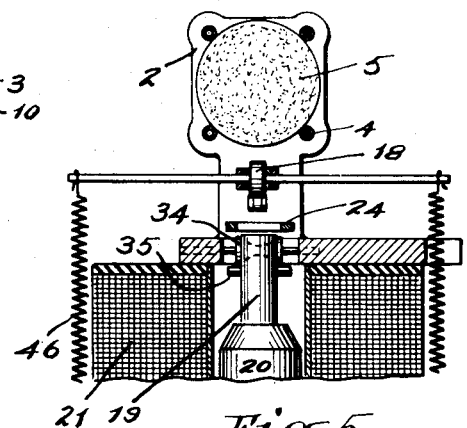
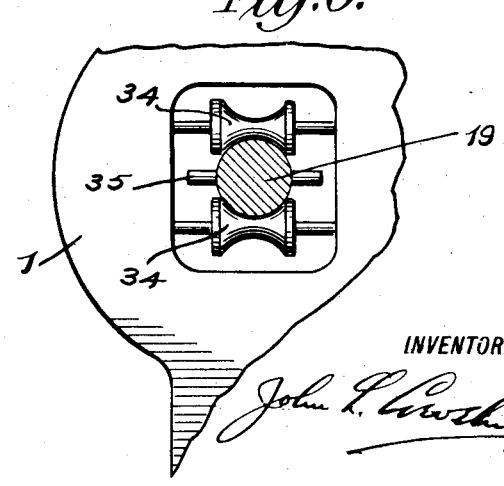
INVENTOR Patented Dec. 5, 1922.

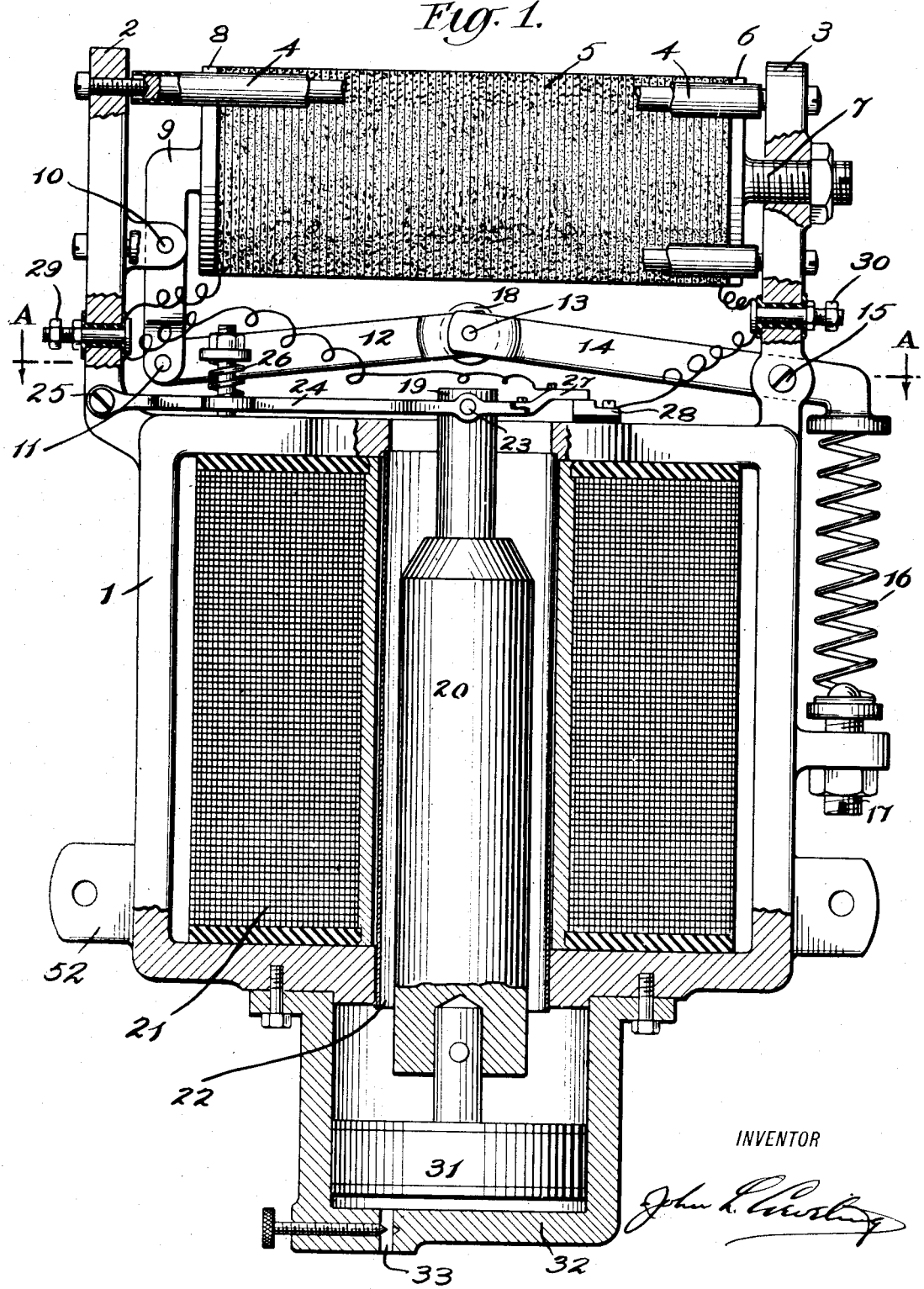

1,437,724

UNITED STATES PATENT OFFICE.

JOHN L. CREVELING, OF WHITE PLAINS, NEW YORK, ASSIGNOR TO GOULD COUPLER COMPANY, A CORPORATION OF NEW YORK.

ELECTRIC REGULATION.

Application filed May 2, 1916, Serial No. 94,969. Renewed April 17, 1922. Serial No. 553,919.

*To all whom it may concern:*

Be it known that I, JOHN L. CREVELING, a citizen of the United States, residing in White Plains, county of Westchester, and State of New York, have invented certain new and useful Improvements in Electric Regulation, of which the following is a description.

My invention pertains to that class of electric regulation wherein it is desired to regulate an electric system or circuit thereof in a predetermined manner and has for a particular object to provide automatic means for so doing. As my invention is particularly applicable to systems of electrical distribution wherein a dynamo or generator driven at variable speeds is used to charge a storage battery and maintain lamps or other translating devices, it will be described with particular reference to such a system, which is selected for the purpose of showing one embodiment of my invention merely. As my invention is particularly useful in such a system wherein it is desired to limit the current in a circuit from exceeding a predetermined value throughout the speed changes of the generator, and wherein it is desirable also to prevent the voltage across a circuit from exceeding a predetermined maximum, as in modern systems of railway carlighting by an axle-driven generator, it will be described particularly with reference to this type of such system.

Fig. 1 is a front elevation and partial section of one of the regulating units of my invention.

Fig. 2 is a top plan and partial section of a portion of the regulator shown in Fig. 1 taken on the line A—A, the parts above said line being removed for the sake of clearness.

Fig. 3 is a front elevation and partial section of a modified form of regulator similar to that shown in Fig. 1.

Fig. 4 is a partial section of the structure of Fig. 3 taken on the line B—B.

Fig. 5 is a top plan and partial section of a portion of the device shown in Figs. 3 and 4.

Figure 6:
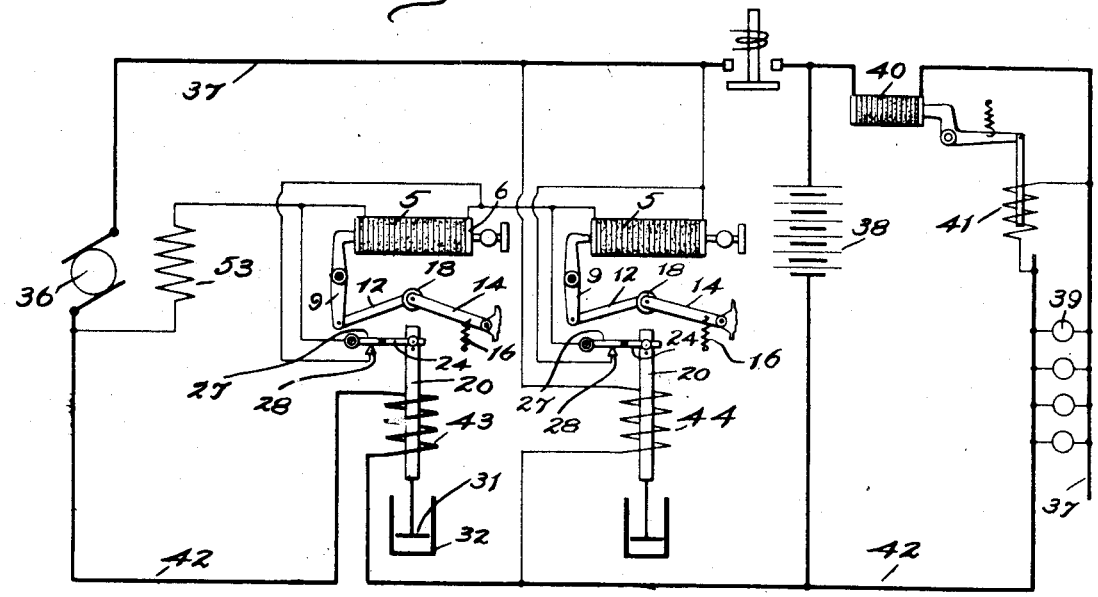
Fig. 6 is a diagrammatic representation of a system of the type above specified employing my invention.

It is a feature of my invention that, while both current and voltage regulation may be required in the same system or even a number of current and voltage regulating devices or units may be required, they may be so constructed that it will be possible to make the same up and carry them in stock, with the exception of the particular windings necessary for the circuits wherein they are to be employed or across which they are to operate. With this in view, for limiting a generator current from exceeding a predetermined value, I employ one regulator usually provided with a coarse series winding responsive to current fluctuations; and where the voltage is to be held also from exceeding a predetermined value, I use a similar regulator with the exception that it is usually wound with a fine winding in shunt across the circuit where the voltage is desired to be held within the predetermined limits. I usually find it preferable to place the regulating elements of these regulators in series and to provide means whereby if the regulating elements always have an appreciable resistance, as for example when the carbon piles are employed, the elements will be shunted out when not required for the purpose of regulation, as will hereinafter more plainly appear.

In Figs. 1 and 2, 1 represents a frame or supporting member carrying all of the members necessary to make up one complete regulating device or unit, which may be put in operative position or removed bodily when desired. The same may be held in proper position, as for example, by suitable lugs indicated at 52. The frame 1 is preferably of iron or other magnetic material and provided with upwardly projecting members 2 and 3, cast integrally therewith and carrying insulated rods 4, which support the regulating element or carbon pile 5 in a well-known manner. One end of the pile has its position adjustably fixed as by means of the disc or flange 6, carried by the screw 7, threaded into the member 3. The other end of the pile has pressure applied thereupon by the flange 8, carried by the lever 9, pivoted as at 10 to a fixed support upon the member 2 and having its opposite, and preferably longer, extremity pivotally connected as at 11 with the member 12, which with its pivotal connection 13 and member 14 forms a toggle-joint, one extremity of which is pivotally held as by screw 15. The compression spring 16, adjustable as by screw 17, tends to straighten the toggle-joint and increase the pressure upon the pile 5, so as to decrease the electrical resistance thereof in a well-known manner. 18 is a small roller or sheave carried by the pin 13, which is engaged by the stub or post 19 when the same is raised sufficiently, the said post being made preferably of non-magnetic material and attached to the core 20 of iron or other magnetic material, surrounded by the actuating winding or solenoid 21, which may be wound upon a spool and readily held in place as by means of the usual slip-tube 22. The post 19 is pivotally connected as at 23 with the lever 24, pivotally connected to the member 2 as at 25, and adjustably pressed downwardly as by spring 26. The lever 24 acts as a guide to hold the core 20 approximately in a central position with reference to the winding 21, and until the coil 21 is sufficiently excited the outer extremity 27 of the lever 24, which is insulated as shown, rests upon the insulated member 28. The member 27 is electrically connected as indicated with the binding post 29 also in electrical connection with the first disc on the left hand side of the carbon pile 5. The member 28 is electrically connected with the binding post 30 and the first carbon disc on the right hand side of the pile 5; therefore, when member 27 is in contact with member 28 the carbon pile 5 is short-circuited with reference to the binding posts 29 and 30. The lower extremity of the core 20 is connected with a piston 31 of any suitable dash-pot, in this instance shown as an air dash-pot, having a cylinder 32 and vent 33. A slight play is allowed in the adjustment between the core or plunger 20 and the piston 31, whereby the slight angular movement caused by lever 24 in the usual operation or movement of the core 20 is prevented from causing the piston to jam in the cylinder.

In Fig. 3, the device shown is substantially the same as that shown in Figs. 1 and 2, with the exception that the toggle-joint formed by the members 12 and 14 has its outermost extremities attached to levers 9 instead of having one end fixed as was the case in Figs. 1 and 2, and the core 20 has its uppermost end held in proper relation to the solenoid 21 by guide rollers 34 engaging the post 19, as are more plainly shown in Figs. 4 and 5. The post 19 is provided in this structure with a pin 35, while the member 24 is perforated so as to allow the post to pass therethrough until the said pin engages the member 24, and thus the core 20 may have a certain vertical movement before performing any function or meeting any resistance due to the operation of lever 24; then further upward movement will move the said lever and still further movement will cause the end of 19 to engage the sheave 18 and relieve the pressure upon the pile 5 in a manner similar to the structure in Figs. 1 and 2.

In the type of structure shown in Figs. 3, 4 and 5, I prefer to use springs drawing downwardly upon the knuckle of the toggle-joint and therefore use an extended pin, which may carry springs 46 upon either side thereof as indicated and which may be made adjustable in any manner desired.

In Fig. 6, 36 represents a dynamo or generator having its positive terminal 37 connected through a suitable automatic switch with a storage battery 38 and with translating devices 39 through a suitable translating circuit regulator 40, in this instance indicated as a carbon pile, the resistance of which is controlled by a shunt coil 41 across the translating devices in a well-known manner. The negative terminals of the translating devices are connected with the negative side of the storage battery 38 and the generator 36 through wire 42 having in series therewith the solenoid 43 forming the winding of one of my regulators such as shown, for example, in Fig. 1. The generator 36 is provided with a shunt coil 53, having in series therewith the pile 5 of one of my regulators controlled by the coil 43, and also in series therewith the pile 5 of a similar regulator controlled by the voltage coil 44 in shunt across the mains 37 and 42.

An operation of the regulator shown in Figs. 1 and 2 is substantially as follows: When the coil 21 is excited, the same tends to lift the core 20 smoothly against the action of dash-pot 31—32, and when sufficiently excited, as may be adjusted by the spring 26, the lever 24 will be raised and the contact 27—28 broken. If the binding posts 29—30 are used to place the regulator in series with the circuit to be regulated, the pile 5 will be shunted out until this connection 27—28 is broken, which point I prefer to adjust to be near that point when it is desired that the regulator shall come into play and perform a further regulating function; then further excitement of the coil 21 will cause the core 20 to rise and the post 19 to strike the sheave 18, when further excitement of the coil 21 will tend to raise the core 20 and, by bending the knuckle of the toggle-joint mechanism, decrease the pressure upon the pile 5 and increase the resistance thereof. The pressure upon the pile 5 may be regulated in considerable degree by adjusting the post 7 to change the angular relation of the members 12 and 14, when the pile is under its maximum compression by taking advantage of the well-known properties of the toggle-joint. The adjustment of the necessary excitation of the coil 21 to cause the same to affect the pile 5 materially may be closely adjusted by proper manipulation of the spring 16. The regulator shown in Figs. 3, 4 and 5 operates in substantially the same manner as the one shown in Figs. 1 and 2, the principal difference being that the core 20 may be raised an appreciable amount, if desired, before performing any regulating function or meeting with any resistance additional to the resistance due to its own weight or other primary adjustment which may be desired, which after being overcome will allow the core 20 to rise and, when at sufficient height, the pin 35 will engage the lever 24 to break a connection similar to 27—28 illustrated in Figs. 1 and 2 and for the same purpose. Then further excitation of the coil 21 will cause the core 20 to be raised and come into contact with the sheave 18 and affect the toggle-joint to decrease the pressure upon the pile 5 by operating both levers 9 instead of the one lever 9 of Figs. 1 and 2. It will, of course, be obvious that, if desired, the pressure upon the pile 5 may be considerably multiplied by properly choosing the position of the fulcra of the levers 9. The operation of the system indicated in Fig. 6 is substantially as follows, it being remembered that the two regulating devices governing the two carbon piles are preferably such pieces of apparatus as described above with reference to Figs. 1 and 2 or Figs. 3, 4 and 5. If the generator be at rest, the main switch will be open and the translating devices 39 may be supplied by the battery 38 and the voltage upon the devices may be held substantially constant through the instrumentality of the regulating device 40 responsive to voltage fluctuations in the coil 41, as is well understood in the art. If the generator 36 have its speed brought up until its voltage is substantially equal to that of the battery 38, the main switch will close in the usual manner and current will then flow from the generator 36 through wire 37; and if the generator voltage be sufficient it may supply current to the battery 38 and translating devices 39, from which return is made through wire 42, having in series therewith the coil or solenoid 43, which is preferably either a spool or a mummified coil of coarse wire wound and placed as shown at 21 in Figs. 1, 2, 3 and 4. After reaching the critical speed the generator will build up very rapidly, as both of the resistances 5 in series with the field coil 53 are shunted out by their respective contacts 27—28. If the current in the coil 43, which in this case is shown as the total generator current and which might be the current in any other circuit, as for example the circuit containing merely the battery 38, tends to increase beyond its predetermined limit, core 20 will be raised against the action of the dash-pot mechanism and the contact 27—28 of the current regulator broken and the normal minimum resistance of the pile 5 inserted in the field circuit. If then the current still continue to rise, core 20 will be raised and contact with 18 established, whereupon further rise in current beyond a predetermined value, which may be determined by adjustment of the spring 16 of Fig. 1, for example, may readily be prevented as the coil 43 will relieve the pressure upon the pile 5 in such manner as to hold this predetermined current value substantially constant. Should the voltage across the circuit regulated by the voltage responsive regulator, in this instance operating in response to fluctuations across coil 44 which is shown across the generator circuit, but which might be shown across any other circuit whose voltage it is desired to limit, tend to rise beyond its predeterminded maximum value, the core 20 of the voltage regulator will rise, first breaking its respective contact 27—28 and placing the minimum resistance of its pile 5 in series with the generator field and then further tendency toward rise in voltage will have the same effect upon the voltage core 20 as current rises have upon the current core 20 and affect the voltage core 20 and affect the voltage pile 5 to prevent the predetermined maximum from being exceeded in a well-known manner. Should the generator slow down, the operation will be substantially the reverse of the above.

It will be noted with reference to Fig. 6 that if one have in stock quantities of the devices or regulating means as shown in one form in Figs. 1 and 2 and in another form in Figs. 3, 4 and 5, of sufficient dimensions for the proper dissipation of heat in the piles 5 to make them of sufficient capacity for the types of systems wherein they may be used and which in train lighting systems, for example, need not vary by any great amount, one has simply to place upon the regulators the proper coils 21 to perform the voltage or current regulating functions desired and use discs of proper thickness in the piles 5 for the voltage of the circuit across which the generator field winding is placed. This is a highly important commercial consideration and one which the applicant believes is found only in his structure.

The shunting of the resistance element of the regulator or regulators not in use, as is fully brought out in a practical illustration in Fig. 6, is also a highly important feature, saving a considerable waste of energy and having other valuable features.

I do not wish in any way to limit myself to the exact construction or details of operation outlined above in describing the embodiments of my invention, for it will be obvious that wide departure may be made in structure and mode of operation without departing from the spirit and scope of my invention as set forth in the following claims:

1. Means for regulating an electric circuit comprehending a plurality of regulating elements each capable of affecting said circuit, voltage responsive means for affecting one of said elements, current responsive means for affecting one of said elements, and means under the control of each of said responsive means for rendering its respective element ineffective without affecting the element.

2. Means for regulating an electric circuit comprehending a plurality of regulating elements each capable of affecting said circuit, voltage responsive means for affecting one of said elements, current responsive means for affecting one of said elements, and means under the control of said responsive means for selectively rendering each of the elements ineffective under predetermined conditions.

3. The combination with a generator, a plurality of regulating elements each capable of affecting the operation thereof and automatic means responsive to different functions of the operation of said generator for operating said elements, of means controlled by said responsive means for selectively rendering each of said elements ineffective without affecting the elements.

4. The combination with a generator, a storage battery, and means for regulating the generator comprehending a plurality of regulating elements, of means responsive to functions of the generator operation for affecting each of said elements, said means being affected by the condition of the storage battery, and means for selectively short-circuiting each of the regulating elements affected by the operation of the responsive means.

5. The combination with a generator, of a regulating element for affecting the operation thereof, a core the movement of which affects said element, a structure for supporting said element and core in operative relation, a coil supported thereby for affecting said core and adapted to respond to fluctuations in the generator current, a like element, core and supporting structure having the element in series with the first named element but having its coil adapted to respond to voltage fluctuations across the generator, and means operated by each of said coils for rendering their respective regulating elements operative and inoperative upon fluctuations in current and voltage below that necessary to affect the elements.

6. The combination with a generator, a storage battery charged thereby, and a generator field circuit, of a plurality of switches in series in said circuit and normally tending to close said circuit, automatic means responsive to voltage and current fluctuations adapted to selectively open said switches and insert resistance in their stead, said responsive means being so arranged that when one of the switches is opened and resistance inserted in its stead in response to current fluctuations, opening of another of said switches and insertion of resistance in its stead in response to voltage fluctuations causes the current responsive means to withdraw the resistance and close the switch operated thereby.

7. A regulator for an electric circuit comprehending a regulating element, lever mechanism affecting the operation thereof, magnetic means for affecting said mechanism, and means operated by said magnetic means independently of the lever mechanism for short-circuiting the regulator whereby the short-circuiting device may be operated without affecting the lever mechanism.

8. A regulator comprehending a regulating element, the effect of which is varied by variations in pressure thereupon, mechanical means for exerting pressure thereupon, electrically operated means for affecting said mechanical means, and means for short-circuiting the regulating means operated by the electrical means independently of the pressure varying mechanism whereby the short-circuiting means may be operated upon fluctuations insufficient to affect said element.

9. Means for regulating an electric circuit comprehending a plurality of regulating units capable of affecting said circuit, responsive means for affecting one of said units, independent responsive means for affecting another of said elements, and means under the control of each of said responsive means for selectively cutting out its respective regulating unit while another regulating unit is operative to thereby affect the circuit in cooperation with the operative unit.

10. An electric system comprehending a plurality of regulating units for affecting the operation of the system, a plurality of responsive means for operating said units combined with means whereby one operating unit is rendered inoperative while another unit is operating by the effect of the last unit is operating by the effect of the last named unit upon the system, which effect affects the responsive means governing the inoperative unit while said unit is inoperative.

11. The combination with a generator, a regulating element for affecting the operation thereof, means for affecting said element in response to voltage fluctuations above a certain value, a second element affecting the operation of the generator, and means for affecting said second element in response to current fluctuations above a certain value, of means operated by the responsive means to render the elements effective and ineffective in response to fluctuations below said above mentioned element-affecting values.

12. The combination with a generator, a regulating element for affecting the operation thereof, means for affecting said element in response to voltage fluctuations above a certain value, a second element affecting the operation of the generator, and means for affecting said second element in response to current fluctuatitons above a certain value, of means operated by the responsive means to render the elements effective and ineffective in response to certain fluctuations predetermined amounts less than the above mentioned element-affecting values.

13. The combination with a generator, a regulating element for affecting the operation thereof, means for affecting said element in response to certain fluctuations above a predetermined value, a second element affecting the operation of the generator, and means for affecting said second element in response to other fluctuations above a predetermined value, of means for rendering the elements effective and ineffective upon certain fluctuations differing predetermined amounts from the above mentioned element-affecting values.

14. The combination with a generator, a regulating element for affecting the operation thereof, means for affecting said element in response to certain fluctuations above a predetermined value, a second element affecting the operation of the generator, and means for affecting said second element in response to other fluctuations above a predetermined value, of means for rendering the elements effective and ineffective in response to certain fluctuations differing predetermined amounts from the above mentioned element-affecting values, and means for adjusting the differences between the values of fluctuations necessary to operate the said effective and ineffective rendering means and the element affecting means.

JOHN I. CREVELING.